United States Patent
Teicher

(10) Patent No.: US 12,024,065 B1
(45) Date of Patent: Jul. 2, 2024

(54) TRANSPORTATION OF ELECTRIC VEHICLES

(71) Applicant: Mordechai Teicher, Hod-Hasharon (IL)

(72) Inventor: Mordechai Teicher, Hod-Hasharon (IL)

( * ) Notice: Subject to any disclaimer, the term of this patent is extended or adjusted under 35 U.S.C. 154(b) by 0 days.

(21) Appl. No.: 18/220,294

(22) Filed: Jul. 11, 2023

Related U.S. Application Data

(60) Provisional application No. 63/525,242, filed on Jul. 6, 2023.

(51) Int. Cl.
| | | |
|---|---|---|
| *B60L 9/18* | (2006.01) | |
| *B60L 53/14* | (2019.01) | |
| *B60P 3/07* | (2006.01) | |

(52) U.S. Cl.
CPC ............. *B60L 9/18* (2013.01); *B60L 53/14* (2019.02); *B60L 2200/26* (2013.01); *B60L 2200/28* (2013.01); *B60L 2210/40* (2013.01); *B60L 2240/421* (2013.01); *B60P 3/07* (2013.01)

(58) Field of Classification Search
CPC ........ B60L 9/18; B60L 53/14; B60L 2200/28; B60L 2210/40; B60P 3/07
USPC .......................................................... 701/22
See application file for complete search history.

(56) References Cited

U.S. PATENT DOCUMENTS

| | | |
|---|---|---|
| 5,111,127 A | 5/1992 | Johnson |
| 5,559,420 A | 9/1996 | Kohchi |
| 7,795,837 B1 | 9/2010 | Haun |
| 8,627,908 B2 | 1/2014 | Wellborn |
| 10,040,370 B2 | 8/2018 | Wei |
| 10,618,537 B2 | 4/2020 | Khosla |
| 10,836,413 B2 | 11/2020 | Da Costa |
| 11,021,178 B2 | 6/2021 | Ghaly |
| 2013/0204455 A1* | 8/2013 | Chia .................... G07C 5/0858 701/1 |
| 2014/0217991 A1 | 8/2014 | Wisniewski |
| 2014/0375272 A1 | 12/2014 | Johnsen |
| 2015/0217656 A1 | 8/2015 | Loftus |
| 2016/0023562 A1 | 1/2016 | Parra Ortiz |
| 2021/0284043 A1* | 9/2021 | Wang ..................... B60L 53/66 |

FOREIGN PATENT DOCUMENTS

| | | | | |
|---|---|---|---|---|
| JP | 6498949 B2 | * | 4/2019 | |
| WO | WO-2019181301 A1 | * | 9/2019 | ............. B63H 21/17 |

OTHER PUBLICATIONS

Machine translation of Ishikawa et al. JP-6498949 (Year: 2019).*
Machine translation of Kazuhiko WO-2019181301-A1 (Year: 2019).*
Screenshots from Ferromobile website https://ferromobile.fr/en/ retrieved Sep. 23, 2023.

* cited by examiner

*Primary Examiner* — Jacob S. Scott
*Assistant Examiner* — Michael E Butler

(57) ABSTRACT

An electric vehicle is transported by an electric carrier whose motor is powered by the main power source—chargeable battery pack or fuel cell—of the transported electric vehicle.

4 Claims, 13 Drawing Sheets

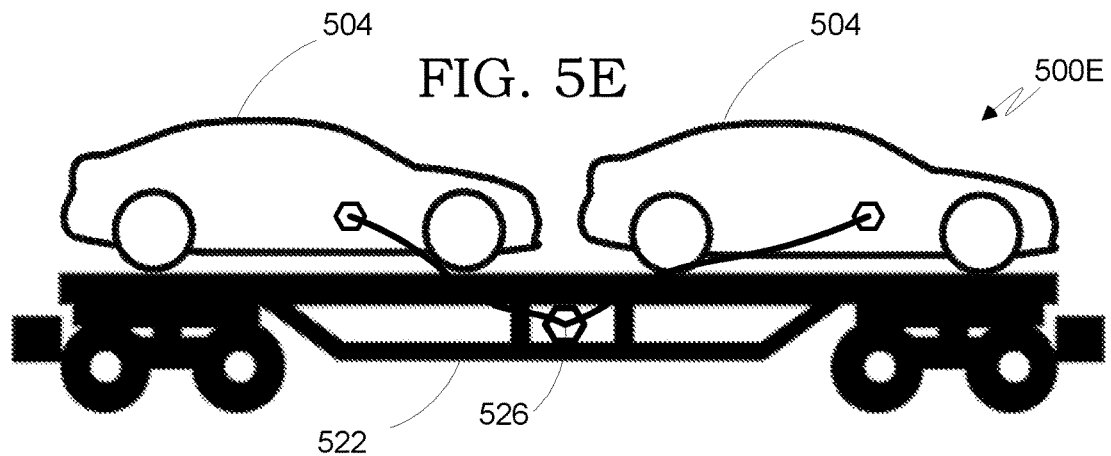
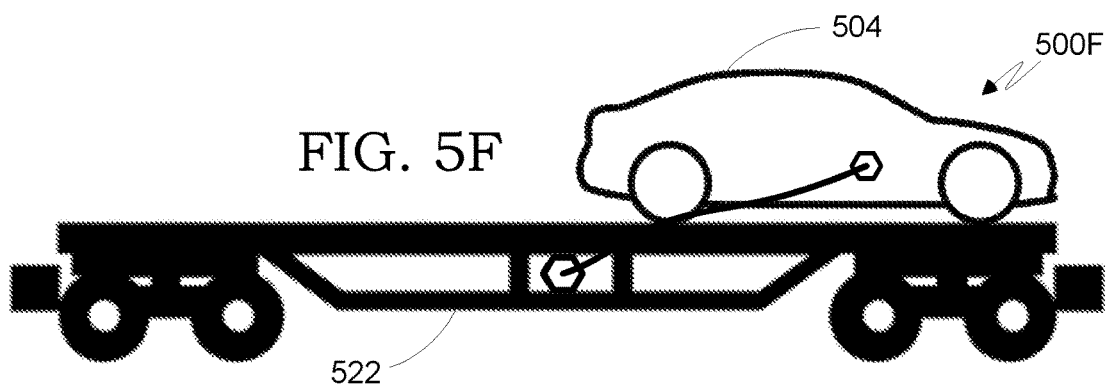
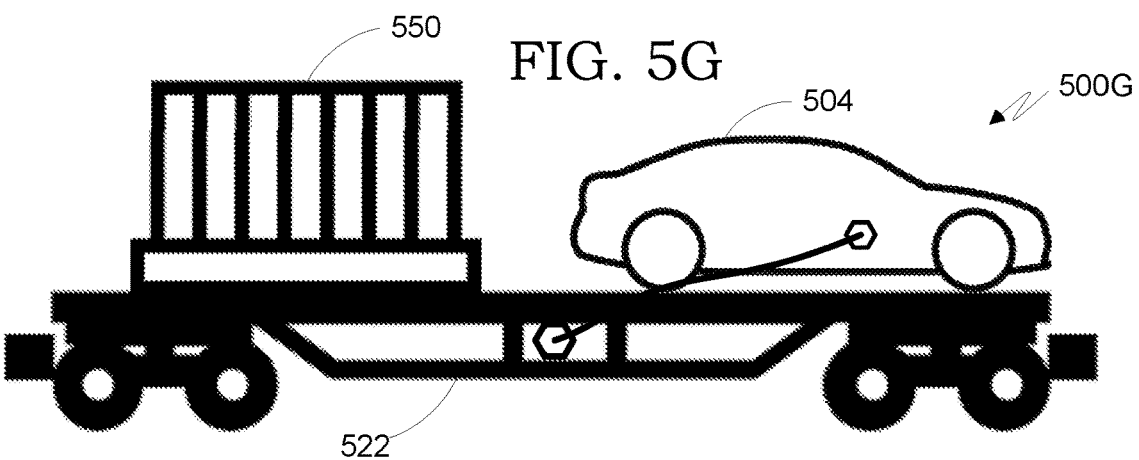
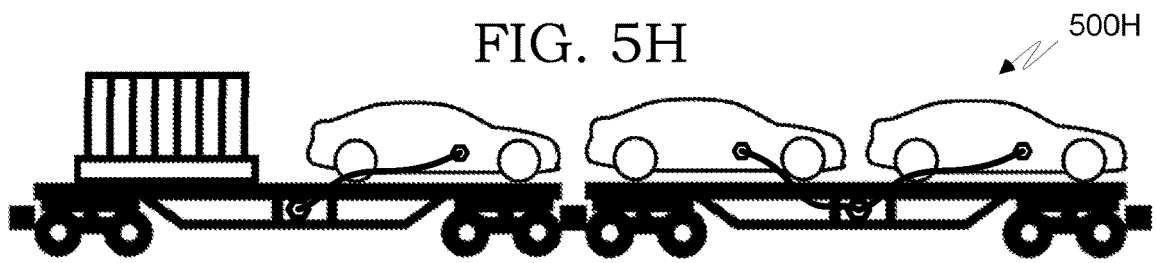

TRANSPORTATION OF ELECTRIC VEHICLES

REFERENCE TO RELATED APPLICATIONS

This application claims the benefit of U.S. provisional patent application 63/525,242 filed on 6 Jul. 2023.

BACKGROUND OF THE INVENTION

Field of the Invention

The present disclosure relates to electric vehicles, and in particular to transportation of electric road vehicles.

Description of Related Art

The present disclosure resides at the crossroad between two major trends: electric vehicles and autonomous vehicles.

Electric vehicle, such as an electric passenger car or electric truck, uses a battery pack or fuel cell to supply electric power that powers an electric motor that drives the vehicle.

In an autonomous vehicle, sensors and compute are harnessed to aid or even replace a human driver in driving the vehicle.

While electric vehicles are gaining popularity toward dominating the market, autonomous vehicles face systemic safety problems that hinder their progress.

The present disclosure combines advancements in electric vehicles and autonomous vehicles to offer a comprehensive key toward attention-free or even driver-free vehicles.

SUMMARY OF THE INVENTION

Definitions

"Road vehicle" abbreviated "vehicle" is a motorized transportation means designed to carry passengers and/or cargo on paved roads. Cars and trucks are examples of road vehicles. "Electric vehicle" is a road vehicle driven by an electric motor.

"Way" herein is a transportation medium other than a paved road, for example a railway or waterway.

"Carrier" herein is a vehicle configured to carry a road vehicle on a way, for example a railcar or ferry.

Highlights

The present disclosure suggests that the safest and most practical autonomous vehicle is an electric vehicle transported by a railcar. Railcars run on rails separately from other traffic; they easily combine into trains that drive safely at high speed; and the car driver is relieved from any action or responsibility during the railed trip. Rail transport also benefits from a huge supportive industry, installed base and regulatory basis, as well as from a plethora of proven technologies, components, safety standards, and public trust.

Furthermore, the present disclosure suggests powering the railcars by electricity supplied by the carried electric vehicle, which offers at least two fundamental advantages: (1) eliminating the need to install, service and power a fail-safe electricity supply system, thereby highly reducing the costs of new railways dedicated to the transport of autonomous cars; and (2) avoiding the consumption of additional electricity at peak hours, and instead use electricity charged by electric cars at off-peak hours, typically overnight.

The present disclosure recognizes that the advantages of energizing carriers by carried vehicles extend beyond rail transportation. For example, a small electric ferry can transport an electric car across a river on demand; or an electric specialty vehicle with giant wheels can carry an electric car across a road obstacle. Both examples become economically feasible by eliminating the need to equip each carrier with sizeable rechargeable battery packs, provide a charging station connected to the grid, and maintain routine charging at off-peak hours.

BRIEF SUMMARY

According to preferred embodiments of the present invention, there is provided a system for transporting electric vehicles, the system including an electric vehicle, an electric carrier selected for transporting the electric vehicle over a way, and a transport control unit for controlling the electric carrier during transporting the electric vehicle.

The electric vehicle may include an electric vehicle motor for driving the electric vehicle; a main power source; a vehicle inverter for drawing DC power from the main power source and supplying variable frequency AC power for powering the electric vehicle motor; and a vehicle power delivery connection for delivering electric power to electric carriers.

The electric carrier may include a deck for supporting the electric vehicle; an electric carrier motor for driving the electric carrier; and a carrier power delivery connection for connecting to the vehicle power delivery connection and delivering electric power from the electric vehicle for powering the electric carrier motor while the electric carrier is transporting the electric vehicle.

The main power source of the electric vehicle is preferably either a rechargeable battery pack, or a fuel cell.

The electric vehicle may be an autonomous car having an autonomous car control unit, with the transport control unit forming part of the autonomous car control unit.

In a preferred embodiment, the electric power delivered from the electric vehicle for powering the electric carrier motor is variable frequency AC power supplied by the vehicle inverter. In another preferred embodiment, the electric power delivered from the electric vehicle for powering the electric carrier motor is DC power.

As an example, the way may be a waterway, with the electric carrier being an electric ferry. Or the way may be a railway, with the electric carrier being an electric railcar for carrying a single electric vehicle. Or the way may be a railway, with the electric carrier being an electric railcar for carrying at least two electric vehicles. Or the way may be a road obstacle, with the electric carrier being configured to carry an electric vehicle across the road obstacle. The above examples are not limiting.

There is also provided an electric carrier for transporting electric vehicles over a way. The electric carrier may include a deck for supporting at least one electric vehicle; an electric carrier motor for driving the electric carrier; and a carrier power delivery connection for connecting to each of the at least one electric vehicle for delivering electric power from each electric vehicle for powering the electric carrier motor while the electric carrier is transporting the at least one electric vehicle.

The electric carrier may further include a transport control unit for controlling the electric carrier during transporting the electric vehicle. The transport control unit may dynamically send to a vehicle inverter of each of the at least one electric vehicle, requests for AC power at varying specified frequencies. The electric carrier motor may then be powered by the AC power of the specified frequencies delivered from the vehicle inverter of each of the at least one electric vehicle.

In another embodiment, the electric carrier may have a carrier inverter, and the electric power delivered via the carrier power delivery connection is DC power converted by the carrier inverter to variable frequency AC power for powering the electric carrier motor.

There is also provided an electric vehicle for being selectably transported by a selectable electric carrier. The electric vehicle includes an electric vehicle motor for driving the electric vehicle; a main power source; a vehicle inverter for drawing DC power from the main power source and supplying variable frequency AC power for powering the electric vehicle motor; and a vehicle power delivery connection for delivering, to an electric carrier that transports the electric vehicle, electric power that is one of: (a) variable frequency AC power supplied by the vehicle inverter, or (b) DC power sufficient for driving the electric carrier.

The electric vehicle may also include a transport control unit for controlling the electric carrier during transporting the electric vehicle. Specifically, the electric vehicle may be an autonomous car having an autonomous car control unit, with the transport control unit forming part of the autonomous car control unit.

The vehicle power delivery connection may be for delivering DC power sufficient for driving the electric carrier, or for delivering variable frequency AC power supplied by the vehicle inverter.

There is also provided a method for transporting an electric vehicle on an electric carrier. The method includes: mounting the electric vehicle on the electric carrier; electrically connecting the electric carrier to the electric vehicle; delivering, from the electric vehicle to the electric carrier, electric power that is either DC power or variable frequency AC power supplied by a vehicle inverter; powering an electric carrier motor of the electric carrier by the electric power delivered from the electric vehicle; and transporting the electric vehicle by the electric carrier.

The electric power delivered from the electric vehicle to the electric carrier may be variable frequency AC power supplied by the vehicle inverter. The method then may further include: synchronously controlling the electric carrier and the vehicle inverter for transporting the electric vehicle.

Alternatively, the electric power delivered from the electric vehicle to the electric carrier may be DC power, and the method further includes: converting, by a carrier inverter, the DC power delivered from the electric vehicle to variable frequency AC power; powering the electric carrier motor by the variable frequency AC power supplied by the carrier inverter; and controlling the electric carrier for transporting the electric vehicle.

It will be noted that all variations above cover both single- and multiple-motor electric vehicles as well as single- and multiple-motor electric carriers.

BRIEF DESCRIPTION OF THE DRAWINGS

The present invention will be understood and appreciated more fully from the following detailed description, taken in conjunction with the drawings in which:

FIGS. 5A-5H are illustrations depicting example railway carriers.

DETAILED DESCRIPTION

Background Art

Figure 1A:
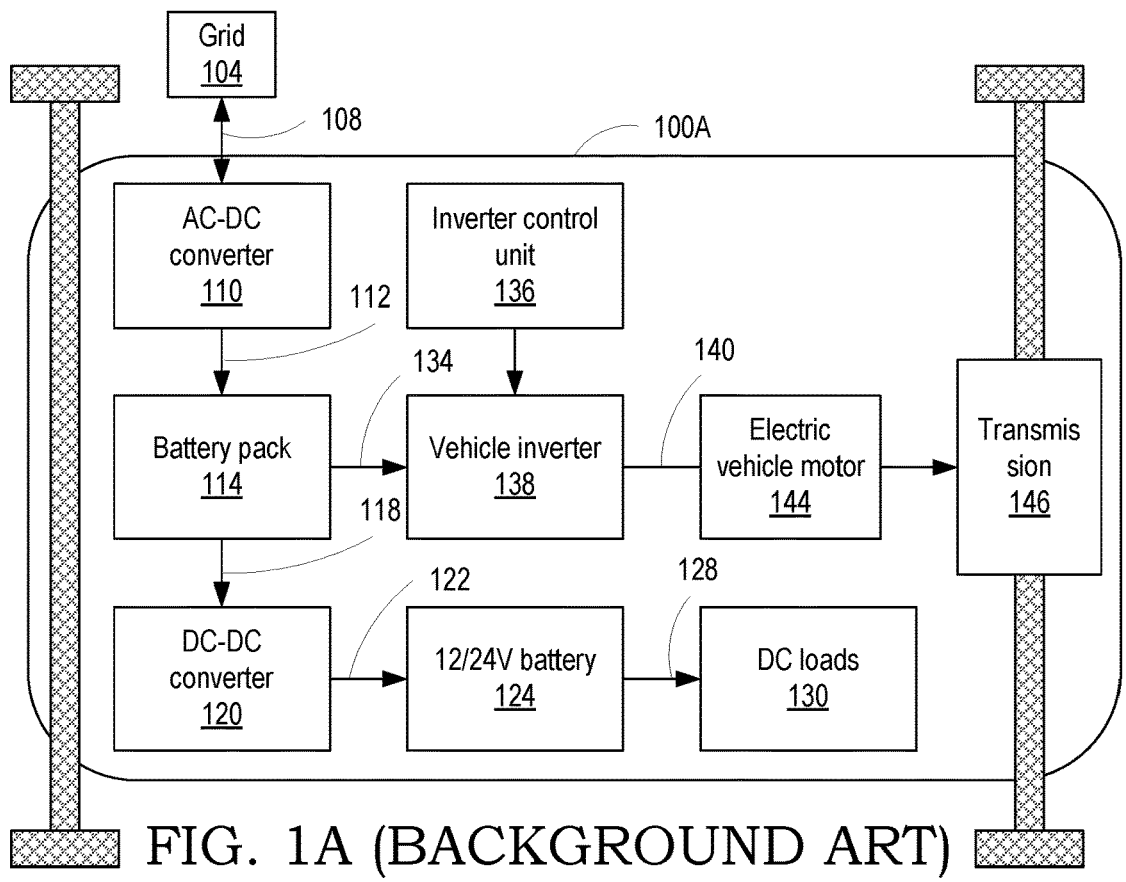
FIGS. 1A-1B are simplified block diagram describing electric vehicles of the background art.

Reference is made to FIG. 1A that schematically describes an electric vehicle 100A of the background art. Battery pack 114 is loaded from the grid 104 via AC charging connection 108 and AC-DC converter 110 that supplies DC charging current 112 to battery pack 114. Battery pack 114 provides hi-voltage DC power 118 to DC-DC converter 120 that supplies low voltage DC battery charging current 122 to 12/24V battery 124, which supplies low voltage power 128 to DC loads 130 such as lighting, multimedia systems, electronics, processors, and the like. Battery pack 114 also supplies hi-voltage DC current 134 to vehicle inverter 138, which supplies variable frequency AC power 140 to electric vehicle motor 144, the frequencies determined by inverter control unit 136. Electric vehicle motor 144 is an AC motor that revolves at an RPM (revolutions per minute) determined by the instant AC frequency provided by vehicle inverter 138, to drive, via transmission 146 the wheels of electric vehicle 100A.

Notably, as of the time of the present disclosure, AC-DC converter 110 may offer, in some car models, bi-directional operation, so that AC charging connection 108 can be used to draw DC power from battery pack 114 and provide AC electricity to the grid, to a house, or to other loads. Vehicle-to-load 240V power output of some example cars ranges from 10A to 15A (2.4 kW to 3.6 kW). Some EVs, such as the Hyundai Ioniq 5 and Kia EV6, have a 3.6 kW power rating equivalent to a 15A outlet. The Ford F-150 lightning offers 9.6 kW via four AC outlets.

Figure 1B:
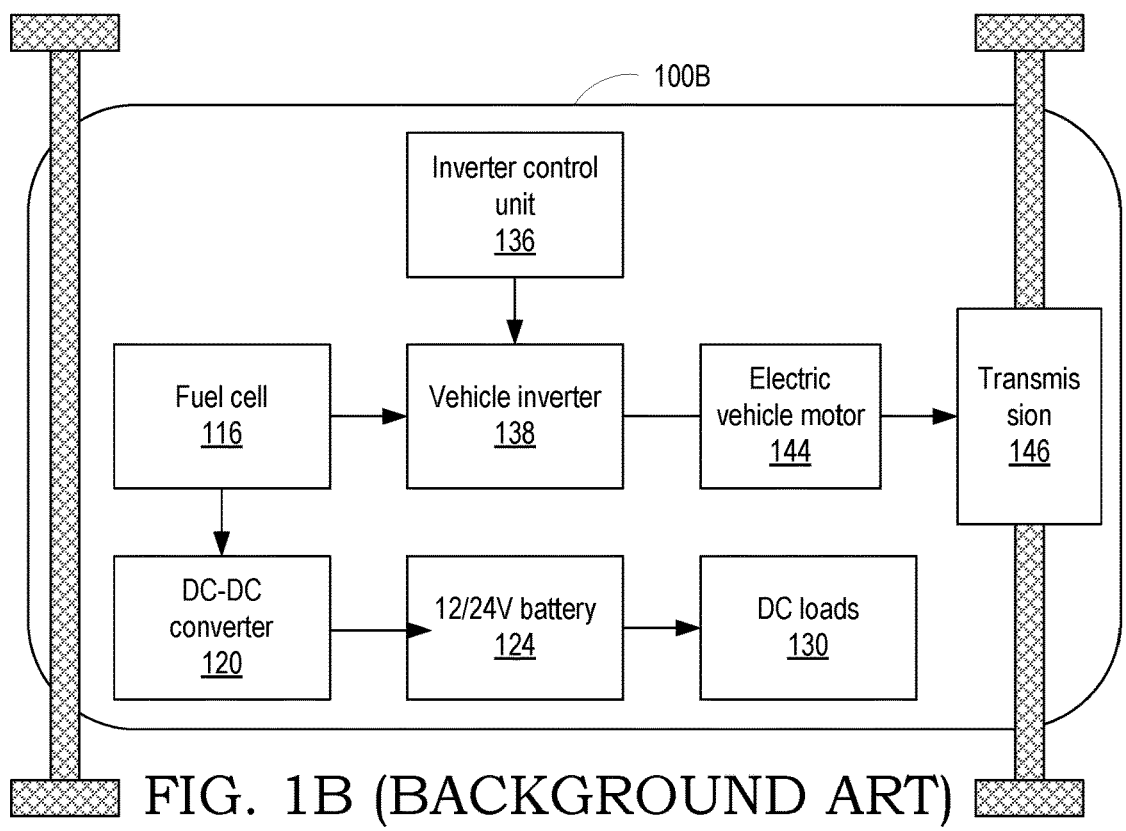

FIG. 1B schematically describes another version of electric vehicle 100B of the background art, with battery pack 114 of FIG. 1A replaced by fuel cell 116, rendering AC-DC converter 110 and grid 104 of FIG. 1A redundant. All other numbered elements of FIG. 1B are the same as their corresponding elements in FIG. 1A.

Simplified Layout

Figure 2:
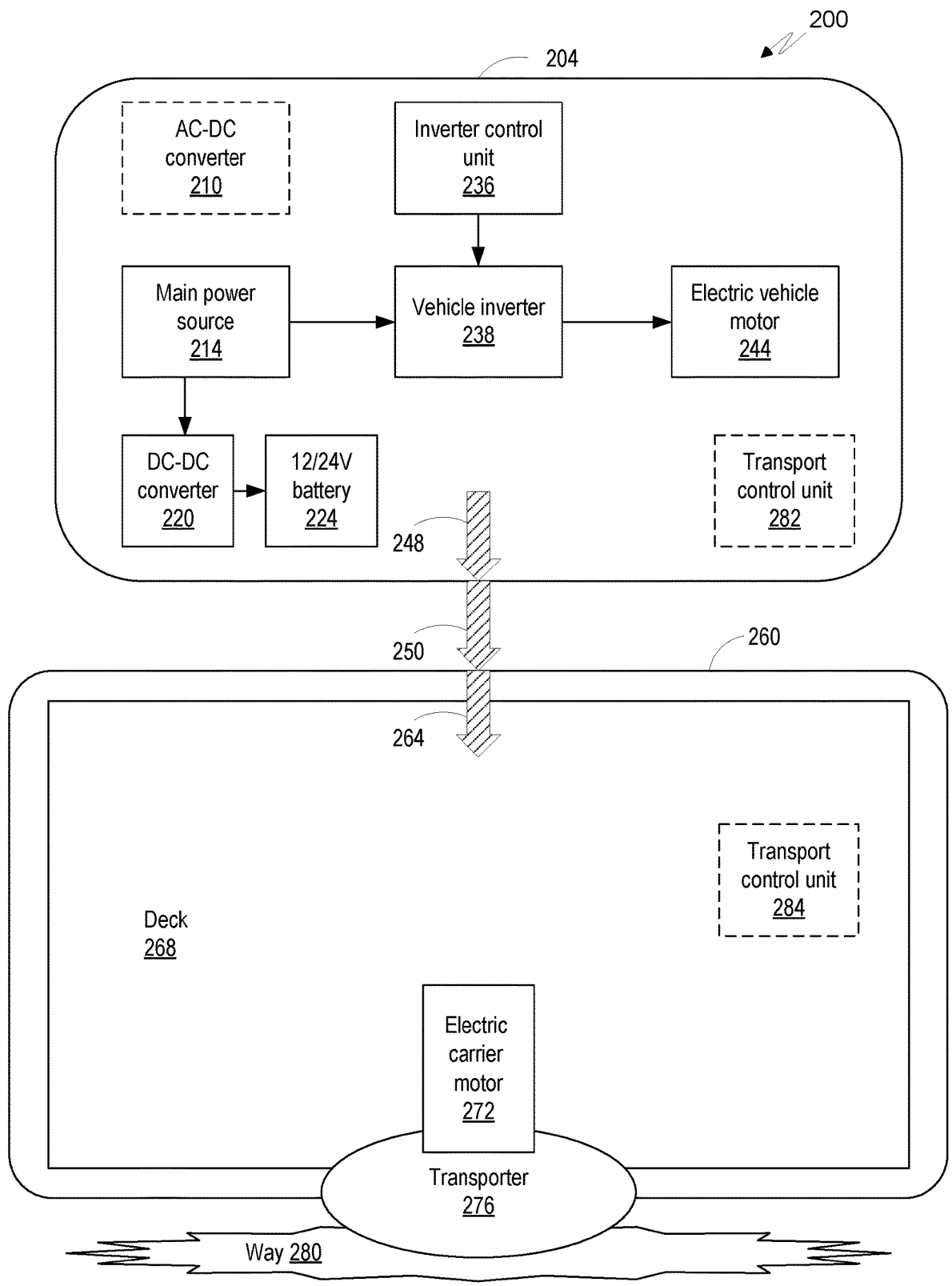
FIGS. 2, 2A-2D are simplified flow diagrams describing various embodiments and ways of delivering electric power from an electric vehicle to an electric carrier that carries the electric vehicle.

FIG. 2 depicts a simplified layout of a transportation system 200 taught by the present disclosure.

Electric vehicle 204 is operative to function similarly to electric vehicle 100A or electric vehicle 100B of FIG. 1A or 1B, respectively. Main power source 214 is either battery pack 114 of FIG. 1A or fuel cell 116 of FIG. 1B. Vehicle inverter 238 draws DC power from main power source 214 and powers electric vehicle motor 244 with variable frequency AC power controlled by inverter control unit 236 to ultimately determine the speed of electric vehicle 204. DC-DC converter 220 coverts high-voltage DC power drawn from main power source 214 to 12 or 24V for charging 12/24 volt battery 224, which is used to power DC loads such as lights, electronic, wipers, etc. Vehicle power delivery connection 248 includes wiring and connectors to deliver electric power to a selectable electric carrier 260.

Electric carrier 260 is an electric device devised to transport electric vehicle 204 over way 280. Deck 268 is any physical arrangement configured to support electric vehicle 204 when transported by electric carrier 260. Transporter 276 driven by electric carrier motor 272 is any mechanism configured to drive and direct electric carrier 260 over way 280. Nonlimiting examples include: (1) electric carrier 260 is a railcar, way 280 is a railway, and transporter 276 is the railcar driving wheels; (2) electric carrier 260 is a ferry, way 280 is a waterway, and transporter 276 is an electric outboard propeller that includes electric carrier motor 272; and (3) electric carrier 260 is a specialty vehicle having giant wheels for crossing road obstacles, way 280 is a road water obstacle, and transporter 276 is an electric winch.

Carrier power delivery connection 264 includes wiring and connectors to deliver electric power from electric vehicle 204 for powering electric carrier motor 272.

Vehicle-carrier power delivery connection 250 connects vehicle power delivery connection 248 and carrier power delivery connection 264. It is essentially an electric cable of an appropriate length for its effective and convenient functionality. In some embodiments it may form part of electric carrier 260. In other embodiments it may be null, where connectors at the ends of vehicle power delivery connection 248 and carrier power delivery connection 264 are devised to engage directly when electric vehicle 204 is mounted on electric carrier 260.

A transport control unit, that forms part of either electric vehicle 204 as transport control unit 282, or electric carrier 260 as transport control unit 284, controls essential functionalities of electric vehicle 204 and electric carrier 260 to drive electric carrier 260 to a destination.

It will be noted that the power delivery system combining vehicle power delivery connection 248, vehicle-carrier power delivery connection 250 and carrier power delivery connection 264, is for powering electric carrier motor 272. The same or different power delivery chain may function for delivering low-voltage electricity from 12/24 volt battery 224 to electric carrier 260, for powering low-power elements of electric carrier 260 such as brakes, lights, electronics and/or processors, including transport control unit 284. This note also applies to FIGS. 2A-2D, and will not be repeated below.

Power Sources

Electric vehicle 204 of FIG. 2 offers four electric power sources to choose from. The power capacities below represent electric vehicles as of the date of this patent application:

(a) AC-DC converter 210, is typically capable, in some car models fitted for bi-directional charging, of supplying a few kilowatts of 240V AC power for powering the grid, home essentials, or another moderate load.

(b) Vehicle inverter 238 is typically capable of powering electric vehicle motor 244 with hundreds of kilowatts of variable frequency AC power, depending on the car model.

(c) Main power source 214 (rechargeable battery pack or fuel cell) is typically capable of supplying hundreds of kilowatts of DC power to vehicle inverter 238B.

(d) 12/24 volt battery 224 supplies low DC power for small instruments, devices and electronics of the car.

The few kilowatts available from AC-DC converter 210 are generally insufficient for car transport. An example exception is transport for a very short distance at a very low speed, for example powering a small 240V AC motor of a few kilowatts coupled with a high reduction ratio gear to drive a specialty giant-wheel carrier for crossing a water road obstacle. This use case is described in FIG. 2A below.

Vehicle inverter 238 or main power source 214 are the most potent power sources for driving electric carrier 260, and will be described in FIGS. 2B and 2C below.

12/24 volt battery 224 cannot provide sufficient electric power for electric carrier motor 272. However, as noted above, it may still power low-power elements of electric carrier 260 such as lights, electronics and/or processors, including transport control unit 284.

Delivering Low-Power AC from Vehicle to Carrier

Figure 2A:
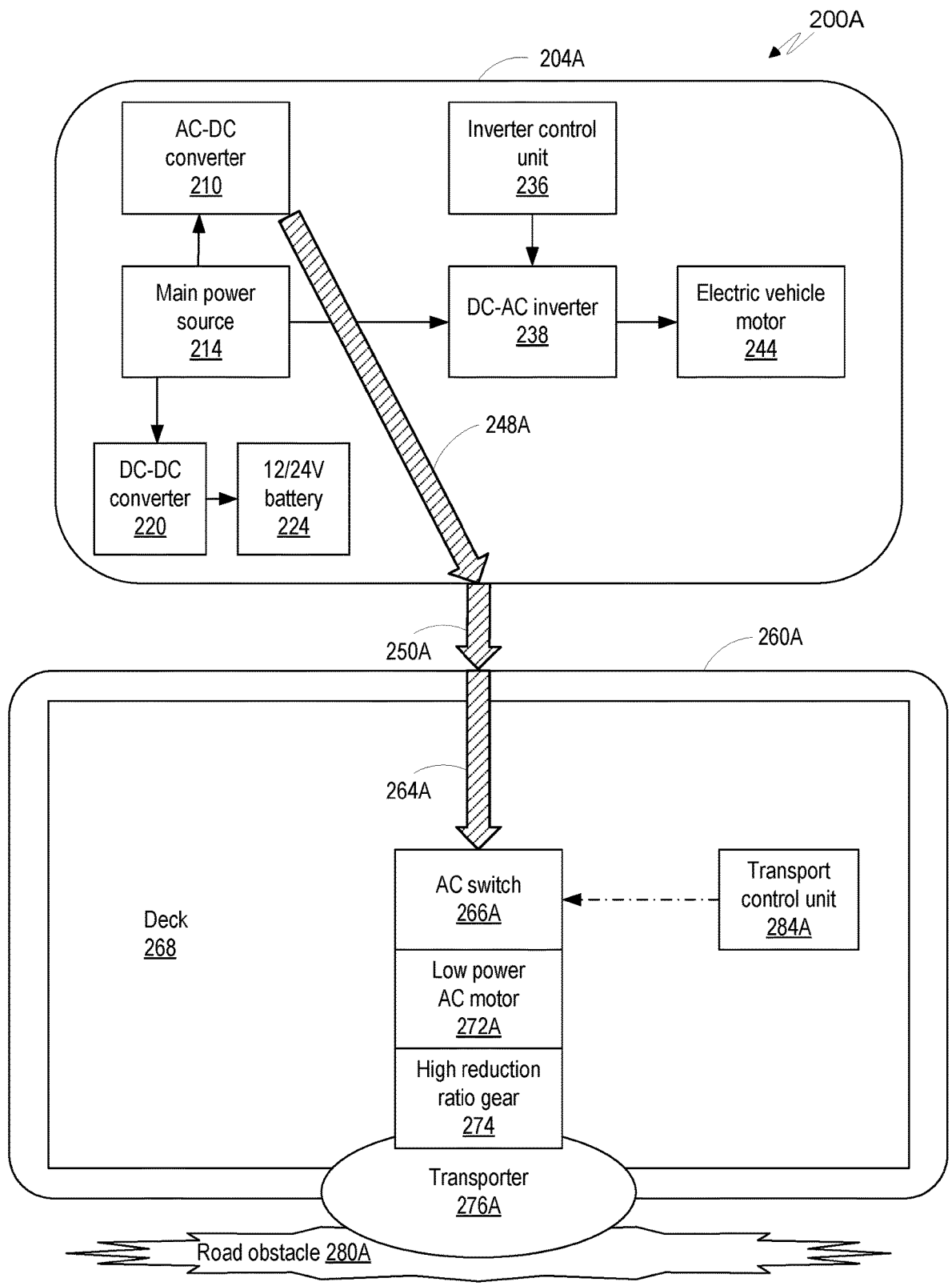

FIG. 2A describes system 200A that makes use of the 50/60 HZ 240V electricity, such as AC power supplied by some electric car models via a bi-directional AC-DC converter 210.

In system 200A, electric power delivered from electric vehicle 204A to electric carrier 260A is AC power supplied by AC-DC converter 210 via vehicle power delivery connection 248A, vehicle-carrier power delivery connection 250A and carrier power delivery connection 264A, through AC switch 266A, to power transporter 276A.

As long as the typical power available from AC-DC converters of some electric cars that feature bi-directional charging is of just a few kilowatts, the embodiment of FIG. 2A may be suited for short-distance, low-speed use cases, for example where electric carrier 260A is a specialty giant-wheel carrier for moving a vehicle across a road obstacle 280A. In such cases, coupling AC motor 272A of a few kilowatts power with high reduction ratio gear 274 may provide sufficient torque for driving transporter 276A, such as by rotating giant wheels of electric carrier 260A or actuating a winch that drives electric carrier 260A.

Transport control unit 284A controls AC switch 266A.

Delivering Variable Frequency AC Power from Vehicle to Carrier

Figure 2B:
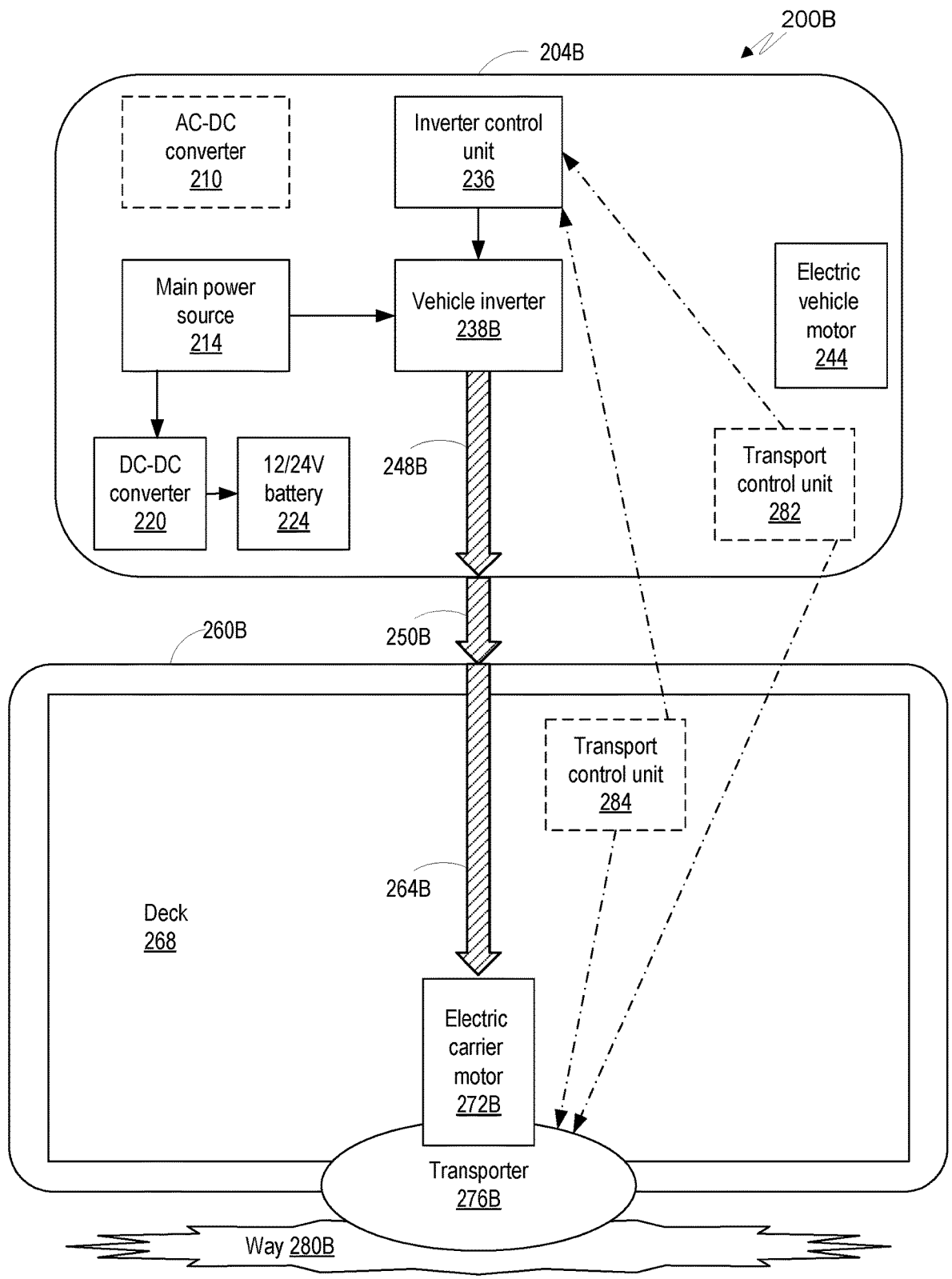

FIG. 2B describes system 200B, where the electric power delivered from electric vehicle 204B to electric carrier 260B is variable frequency AC power supplied by vehicle inverter 238B via vehicle power delivery connection 248B, vehicle-carrier power delivery connection 250B and carrier power delivery connection 264B, to power electric carrier motor 272B that drives electric carrier 260B.

In the configuration of system 200B, electric vehicle 204B not only supplies power to electric carrier 260B, but also effectively controls the speed of electric carrier 260B, since the frequency of the variable frequency AC power supplied by vehicle inverter 238B determines the RPM (revolutions per minutes) of electric carrier motor 272B, which ultimately determines the speed of electric carrier 260B. Accordingly, the transport control unit, implemented either as transport control unit 282 embedded in electric vehicle 204B or transport control unit 284 embedded in electric carrier 260B, synchronously controls both inverter control unit 236 to determine the speed of electric carrier 260B, and transporter 276B to affect other driving functionalities, such as braking and steering, where appropriate.

Delivering Dc Power from Vehicle to Carrier

Figure 2C:
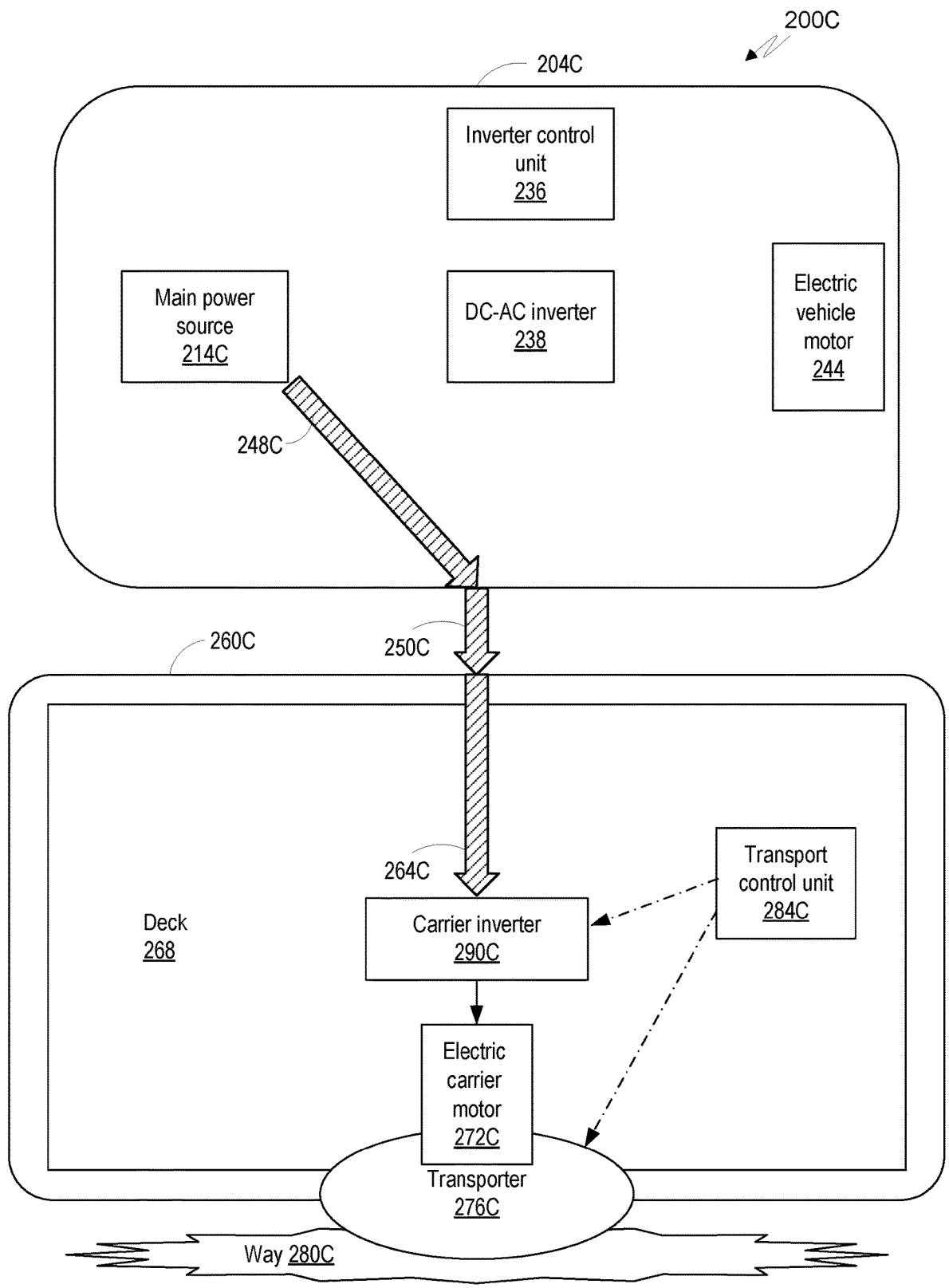

FIG. 2C describes system 200C, where the electric power delivered from electric vehicle 204C to electric carrier 260C is DC power. The DC power is either directly drawn from main power source 214C, or may pass through a high-power DC-DC converter (not shown) to reduce voltage for technical or safety reasons. The DC power is delivered to carrier inverter 290C via vehicle power delivery connection 248C, vehicle-carrier power delivery connection 250C and carrier power delivery connection 264C. Carrier inverter 290C then supplies variable frequency AC power to power and determine the RPM (revolutions per minute) of electric carrier motor 272C. Transport control unit 284C synchronously controls both carrier inverter 290C to ultimately determine the speed of electric carrier 260B, and transporter 276B to affect other driving functionalities, such as braking or steering, where appropriate.

In some embodiments, electric carrier motor 272C may be a DC motor, in which case carrier inverter 290C is replaced by a DC motor control unit (not shown).

Autonomous Car

Figure 2D:
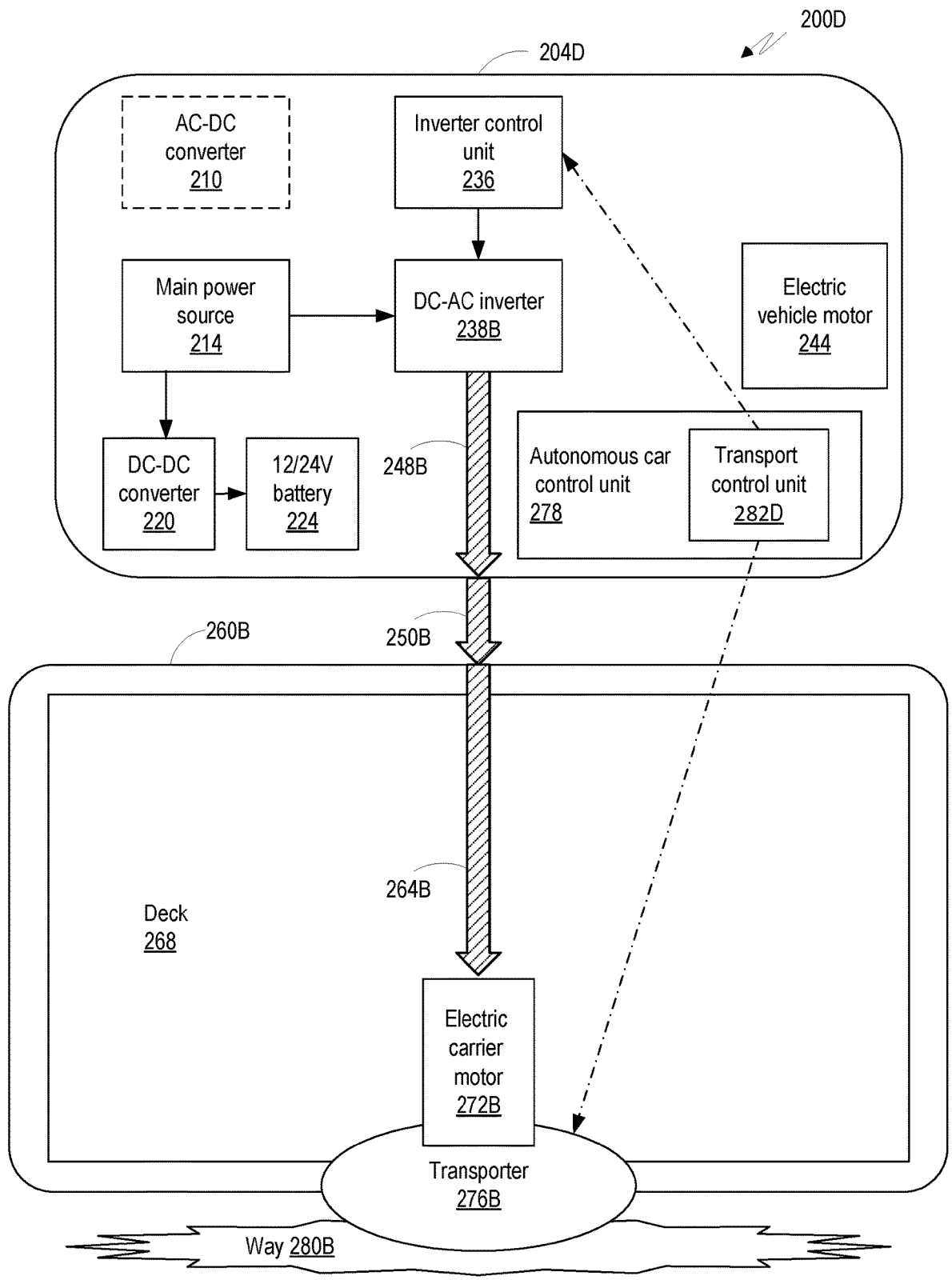

FIG. 2D describes system 200D, that is similar to system 200B of FIG. 2B, except that the electric vehicle is electric autonomous car 204D that is controlled by autonomous car control unit 278, and transport control unit 282D forms part of the autonomous car control unit 278.

Accordingly, in electric autonomous car 204D, control unit 278 controls normal rides of the autonomous car on the road, as well as carried rides when the autonomous car is transported by an electric carrier controlled by autonomous car control unit 278 via its transport control unit 282D.

EXAMPLES

Figure 3:
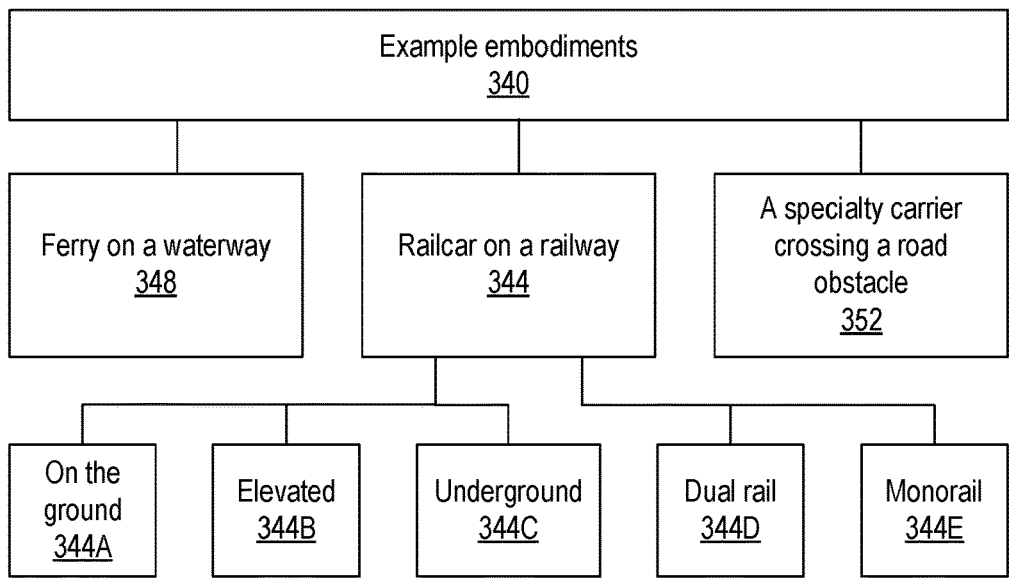
FIG. 3 is a block diagram that describes example embodiments of electric carriers transporting electric vehicles over a way.

FIG. 3 reviews several example embodiments 340 of system 200 of FIG. 2. In example 344, the electric carrier is a railcar, and the way is a railway. In implementation 344A the railway is laid on the ground; in implementation 344B the railway is elevated above the ground; in implementation 344C that railway is laid underground. Cases 344D and 344E refer to the use of dual rail or monorail in the implementations 344A-344C.

In example 348, the electric carrier is a ferry, and the way is a waterway. The ferry can be of a small size, to accommodate a single electric vehicle, or of a larger size, to accommodate several electric vehicles powering the electric ferry.

Example 352 pertains to a specialty electric carrier for carrying an electric vehicle across a road obstacle, such as a water obstacle. This case typically involves very short trips at a very slow speed, as described above with reference to FIG. 2A.

Operation

Figure 4A:
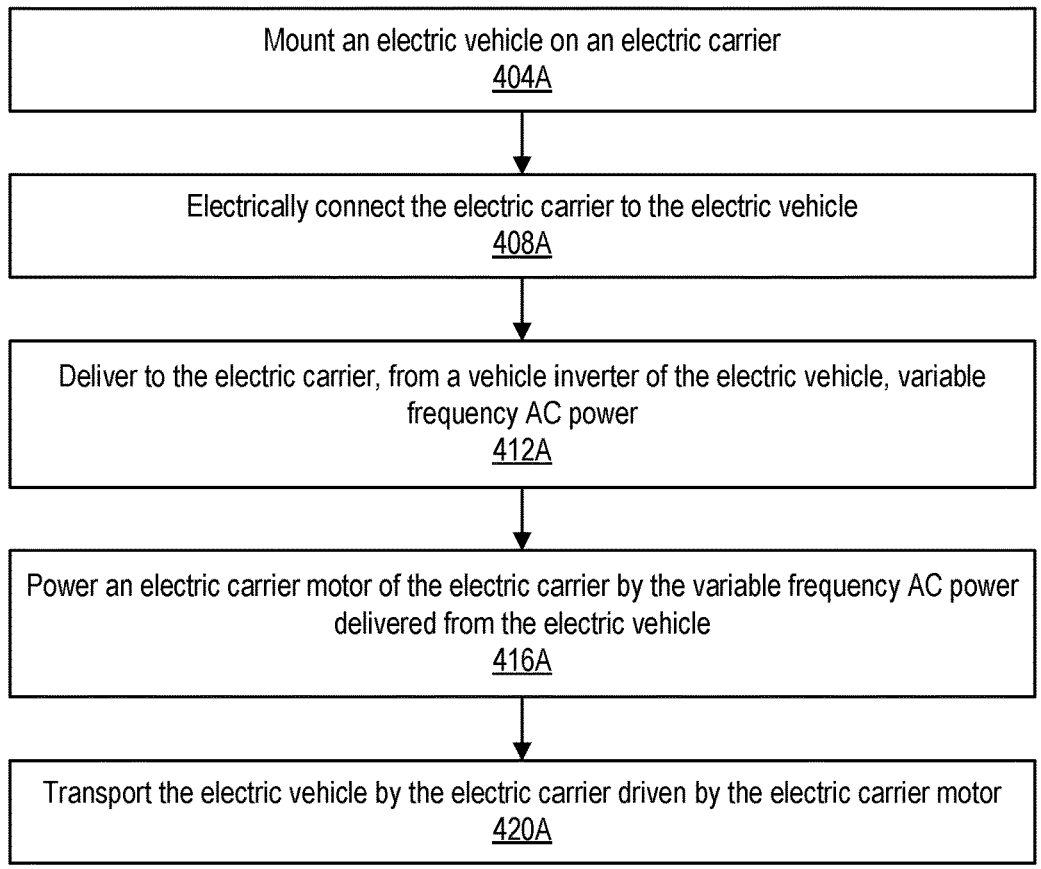
FIGS. 4A-4D are flowcharts describing methods for delivering power to electric carriers from electric vehicles transported by the carriers.

FIG. 4A describes a method of operating a system for transporting electric vehicles according to a preferred embodiment of the present invention.

In step 404A an electric vehicle is mounted on an electric carrier. In step 408A the electric carrier is electrically connected to the electric vehicle, so that electric power can be delivered from the carried electric vehicle to the electric carrier. In step 412A, variable frequency AC power is delivered to the electric carrier from a vehicle inverter of the electric vehicle. In step 416A, an electric carrier motor of the electric carrier is powered by the variable frequency AC power delivered from the electric vehicle. In step 420A the electric vehicle is transported by the electric carrier driven by the electric carrier motor.

It will be noted that the powering of the electric carrier motor in step 416A by variable frequency AC power delivered from the vehicle inverter of the electric vehicle is step 412A, effectively makes the speed of the electric carrier determined by the instant frequency of the AC power delivered from the vehicle inverter.

Figure 4B:
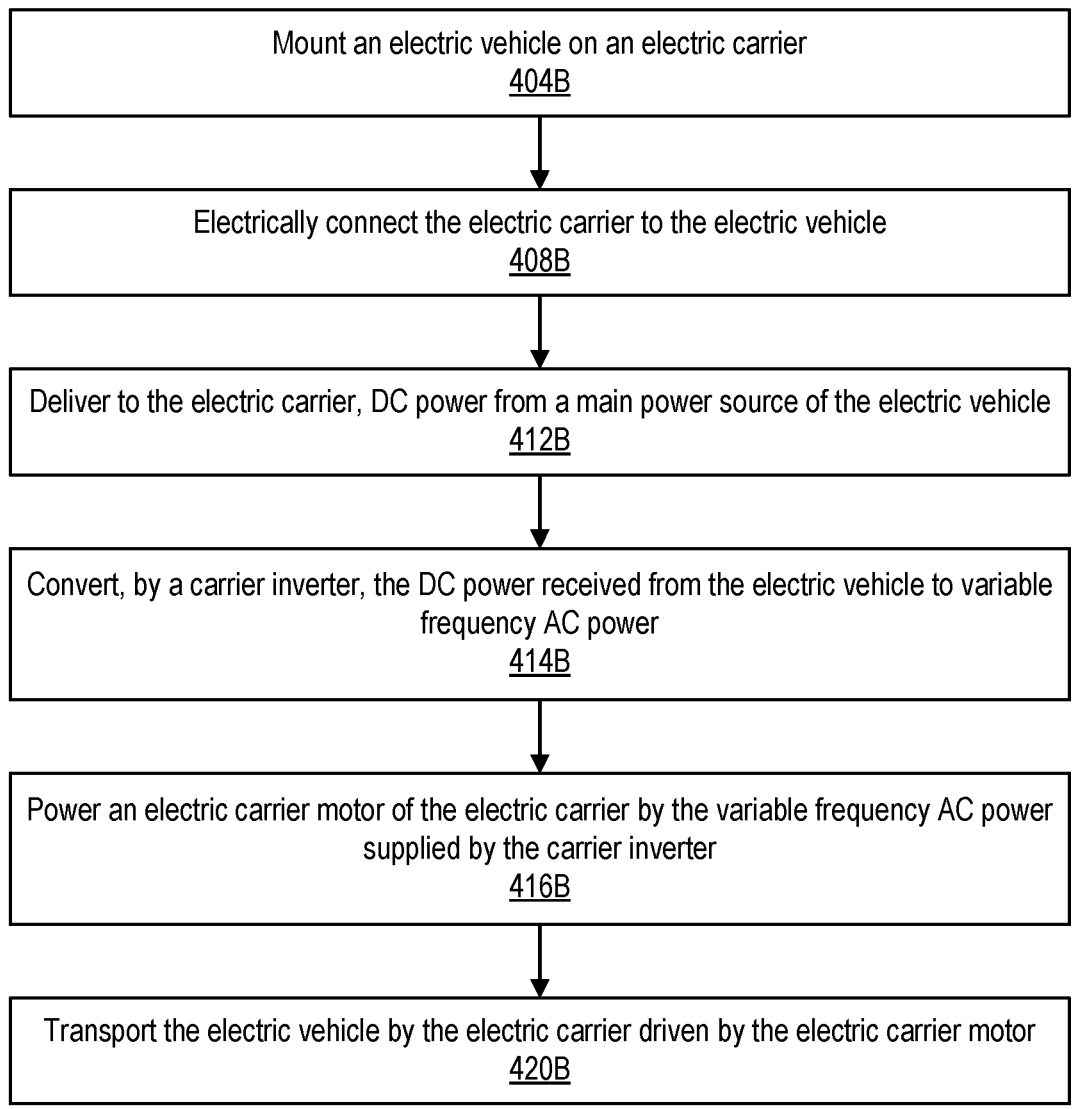

FIG. 4B describes a method of operating a system for transporting electric vehicles according to another preferred embodiment of the present invention, with the electric power delivered from the transported vehicle to the transporting carrier being DC power.

In step 404B an electric vehicle is mounted on an electric carrier. In step 408B the electric carrier is electrically connected to the electric vehicle, so that electric power can be delivered from the carried electric vehicle to the electric carrier. In step 412B, DC power from a main power source of the electric vehicle is delivered to the electric carrier. In step 414B, a carrier inverter of the electric carrier converts the DC power received from the electric vehicle to variable frequency AC power. In step 416B, an electric carrier motor of the electric carrier is powered by the variable frequency AC power supplied by the carrier inverter. In step 420B the electric vehicle is transported by the electric carrier driven by the electric carrier motor.

Figure 4C:
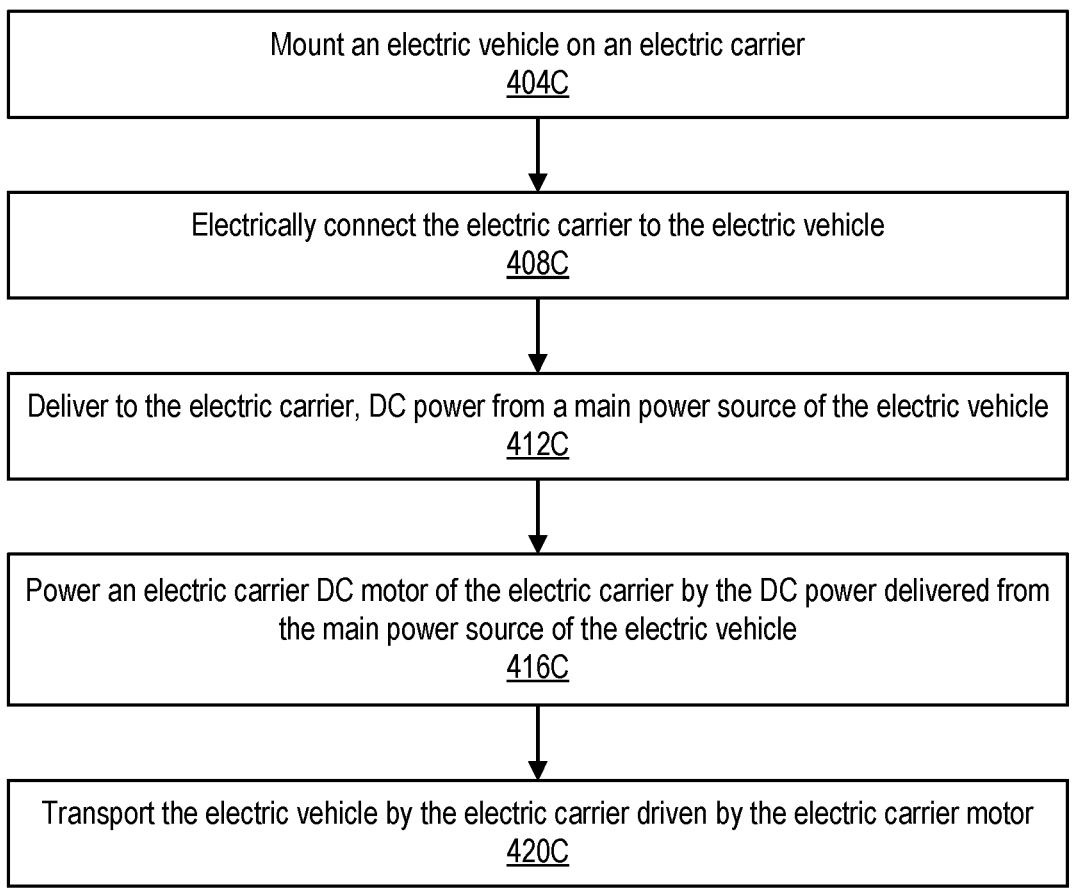

FIG. 4C describes a method of operating a system for transporting electric vehicles according to still another preferred embodiment of the present invention, with the electric power delivered from the transported vehicle to the transporting carrier being DC power for powering a DC motor of the electric carrier.

In step 404C an electric vehicle is mounted on an electric carrier. In step 408C the electric carrier is electrically connected to the electric vehicle, so that electric power can be delivered from the carried electric vehicle to the electric carrier. In step 412C, DC power from the electric vehicle is delivered to the electric carrier. In step 416C, a DC electric carrier motor of the electric carrier is powered by the DC power delivered from the electric vehicle. In step 420C the electric vehicle is transported by the electric carrier driven by the electric carrier motor.

Figure 4D:
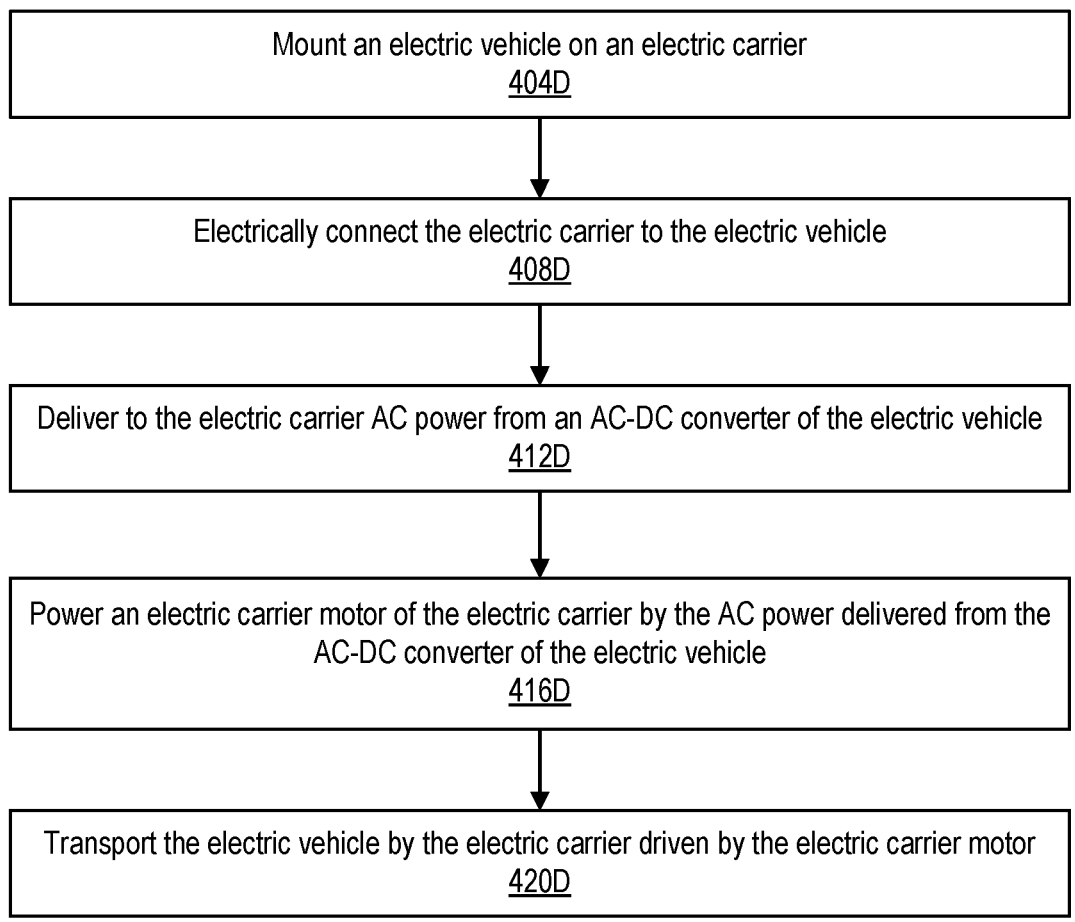

FIG. 4D describes a method of operating a system for transporting electric vehicles according to still another preferred embodiment of the present invention, with the electric power delivered from the transported vehicle to the transporting carrier being AC power from an AC-DC converter of the electric vehicle.

In step 404D, an electric vehicle is mounted on an electric carrier. In step 408D, the electric carrier is electrically connected to the electric vehicle, so that electric power can be delivered from the carried electric vehicle to the electric carrier. In step 412D, AC power is delivered to the electric carrier from an AC-DC converter of the electric vehicle. In step 416D, an electric carrier motor of the electric carrier is powered by the AC power delivered from the AC-DC converter of the electric vehicle. In step 420D, the electric vehicle is transported by the electric carrier driven by the electric carrier motor.

It will be noted that as long as AC power supplied by AC-DC converters of electric vehicles is of just a few kilowatts, the method of FIG. 4D is for limited applications discussed above with reference to FIG. 2A.

Power Delivery from Several Electric Vehicles

In some embodiments, an electric carrier may carry two (or more) electric vehicles. While a typical electric vehicle can provide 100 KW or more of power that is sufficient to transport, for example, several vehicles on a railcar, it may be the interest of the participating electric vehicle drivers to equally share the electric energy contributed for their joint ride. A technical way of doing so may be based on cyclic time sharing, wherein each vehicle delivers power to the carrier motor for, say, one minute, and is then disconnected and power is delivered to the carrier from the next vehicle in the cycle. Other methods known in the art for consolidating electrical power from multiple sources are beyond the scope of the present disclosure.

Examples of Railway Carriers

FIGS. 5A-5H depict examples of railway electric carriers that are constructed and operate according to preferred embodiments of the present invention.

Figure 5A:
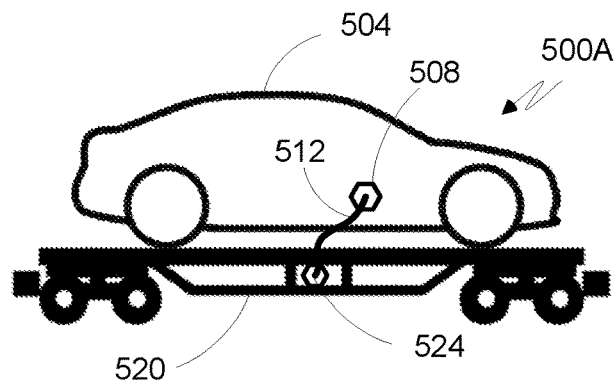

FIG. 5A depicts loaded electric carrier 500A that is electric railcar 520 that transports electric vehicle 504. A carrier motor of electric railcar 520 (not shown) is powered by electric vehicle 504 via vehicle power delivery connector 508, vehicle-carrier power delivery connection 512, and carrier power delivery connector 524.

Figure 5B:
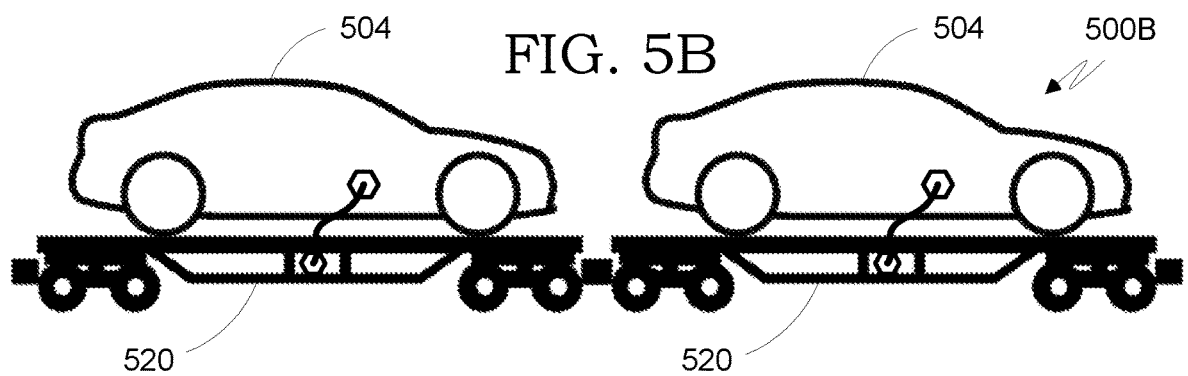

FIG. 5B depicts loaded electric train 500B that is a train of two loaded railcars of FIG. 5A.

Figure 5C:
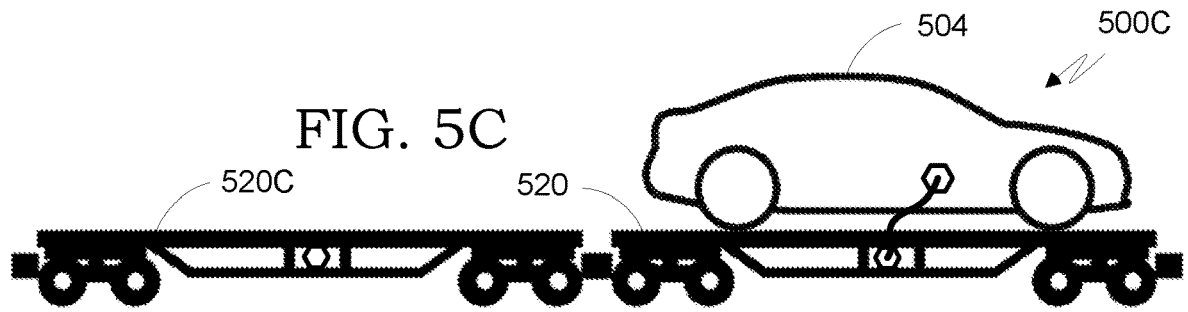

FIG. 5C depicts loaded electric train 500C that is similar to loaded electric train 500B of FIG. 5B, except that the second electric railcar 520C is not loaded, and is towed and/or powered by electric railcar 520. This configuration may be useful for returning empty railcars to loading points that face a shortage of railcars.

Figure 5D:
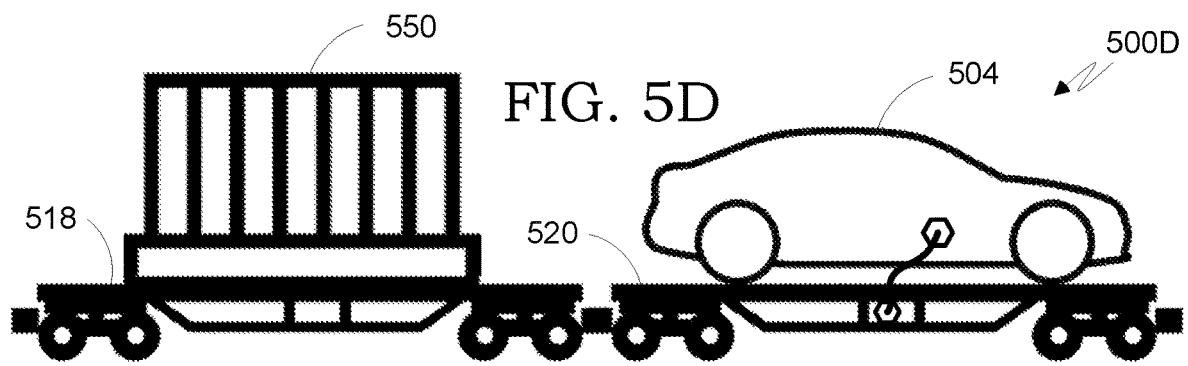

FIG. 5D depicts loaded electric train 500D made of loaded electric carrier 500A of FIG. 5A towing a dumb (non-motorized) railcar 518 carrying arbitrary cargo 550.

FIG. 5E depicts loaded electric carrier 500E that is an extended electric railcar 522 that carries and is powered by two of electric vehicle 504. Extended electric railcar 522 has a motor receiving power from the two electric vehicles via a two-port carrier power delivery connector 526. Power delivery from two (or more) sources may be based, for example, on cyclic time sharing, wherein each electric vehicle delivers power to the electric carrier for, say, one minute, and is then disconnected and power is delivered to the electric carrier from the next electric vehicle in the cycle.

FIG. 5F depicts loaded electric carrier 500F where the extended electric railcar 522 is loaded with and powered by a single electric vehicle 504.

FIG. 5G depicts loaded electric carrier 500G where the extended electric railcar 522 that carries and is powered by electric vehicle 504, is loaded also with arbitrary cargo 550.

FIG. 5H depicts loaded electric train 500H that includes two extended electric railcars carrying and powered by electric vehicles and also carrying arbitrary cargo.

Verifying Sufficient Electrical Energy in Advance

Figure 6:
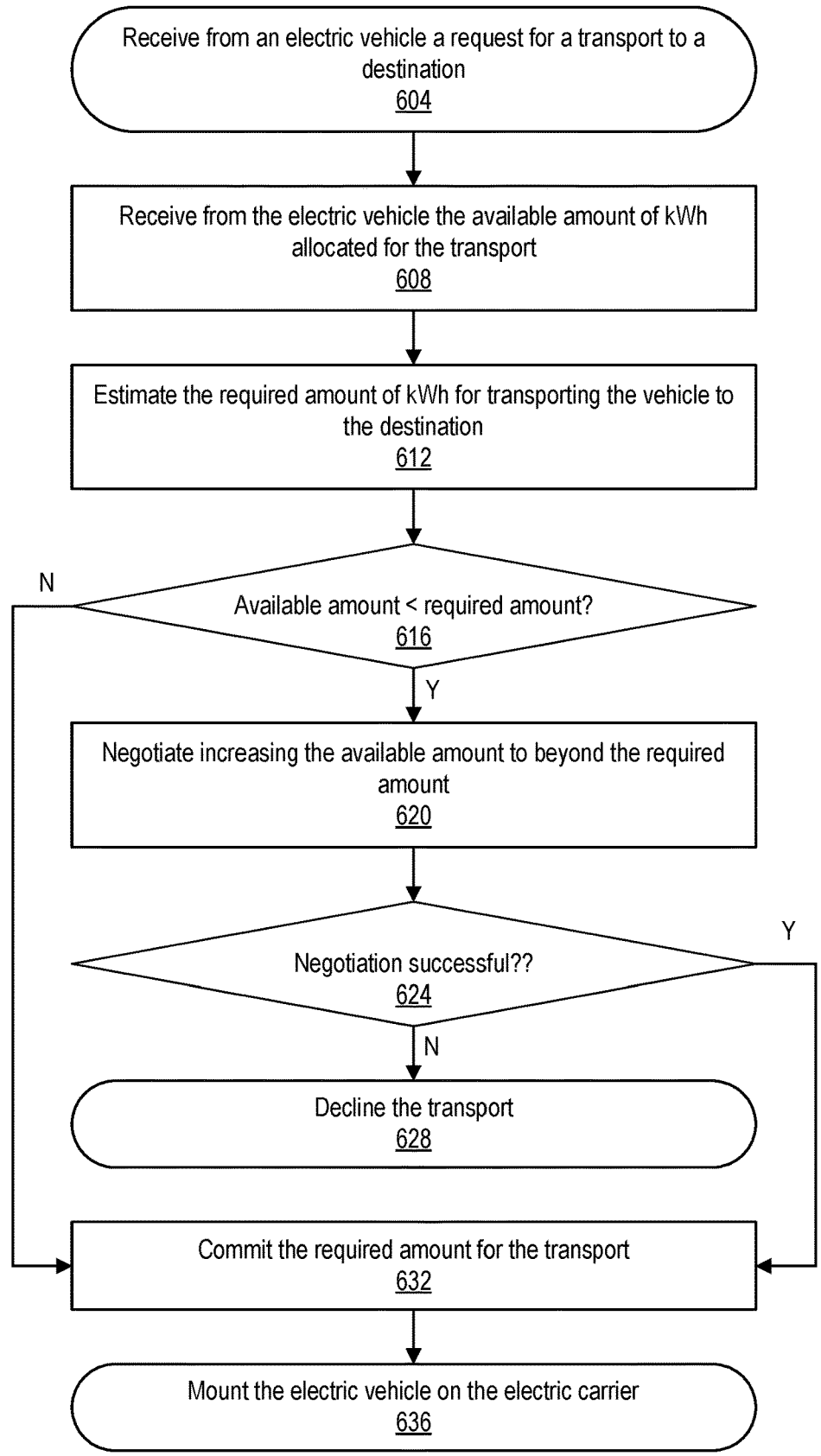
FIG. 6 is a flowchart depicting verification of sufficient electrical energy toward mounting an electric vehicle on an electric carrier.

FIG. 6 is a flowchart depicting verifying in advance that an electric vehicle has and allocates a sufficient amount of electrical energy (kWh) in its main power source, for powering the electric carrier that transports the electric vehicle up to reaching a designated destination. The flowchart is to be preferably implemented in a transport control unit that is any of transport control unit 282, transport control unit 284, transport control unit 284A, or transport control unit 284C of FIGS. 2, 2A-2C. Alternatively, the flowchart can be implemented in a separate access control system that controls access of electric vehicles to electric carriers.

In step 604 a request for a transport to a specified destination is received. In step 608, an amount of kWh available and allocated for the transport is received from the vehicle or the driver. Often, the amount allocated for the transport may be smaller than the remaining kWh amount in the main power source, since there may be a need for reserving electrical energy available also for subsequent trips prior to recharging the battery pack or replenishing the fuel cell of the vehicle.

In step 612 the amount of kWh required to reach the destination, by the electric carrier carrying the electric vehicle, is estimated according to route, weight and distance data, preferably including a safety factor. In step 616 the available amount of step 608 is compared to the required amount of step 612. If the available amount is sufficient, then in step 632 the electric vehicle commits to provide the available amount during the travel to the destination, and in step 636 the electric vehicle is mounted on the electric carrier.

If step 616 finds that the available amount is insufficient, yet the remaining amount of kWh in the main power source of the electric vehicle is sufficient, then step 620 negotiates with the electric vehicle driver providing the required amount, which may oblige the driver to change travel plans, turn off climate control, or recharge earlier than originally planned. If in step 624 the negotiation is successful, then steps 632 and 636 are executed. Otherwise, the transport is declined in step 628 for insufficient kWh supply for reaching the designated destination.

CONCLUSION

The present disclosure teaches transporting electric vehicles by electric carriers that are powered by the main power sources—rechargeable batteries or fuel cells—of the carried vehicles. This paradigm enables:
  A. Highly simplifying and reducing the costs of electric carriers, by eliminating onboard power sources for the carriers. For example, a small ferry that transports an electric car across a river on demand, does not require a sizeable battery pack of its own.
  B. Highly simplifying infrastructures and reducing their costs and daily service. For example, the ferry system above does not require a dedicated charging infrastructure, connection to the grid, and routine charging at off-peak hours overnight. Even more dramatically, carriers that are railcars require just plain light-duty rails, with no need for a fail-safe heavy-duty electricity supply system which is extremely expensive to acquire, install, service, and operate.
  C. Eliminating major additional peak-hour loads on the grid, which could be required for operating a new fleet of electric railcars powered conventionally.

Advantage A-C accumulate into enabling a new, practical breed of autonomous cars, as well as other new transportation instruments implemented as electric vehicles transported by electric carriers that are powered by the carried vehicles.

While the invention has been described with respect to a limited number of embodiments, it will be appreciated by persons skilled in the art that the present invention is not limited by what has been particularly shown and described herein. Rather the scope of the present invention includes both combinations and sub-combinations of the various features described herein, as well as variations and modifications which would occur to persons skilled in the art upon reading the specification and which are not in the prior art.

What is claimed is:

1. An electric carrier for transporting an electric vehicle over a way, the electric carrier comprising:
   a deck for supporting the electric vehicle;
   an electric carrier motor for driving the electric carrier;
   a carrier power delivery connection for delivering electric power from the electric vehicle for powering the electric carrier motor while the electric carrier is transporting the electric vehicle; and a transport control unit for controlling the electric carrier during transporting the electric vehicle;

wherein the transport control unit dynamically sending to a vehicle inverter of the electric vehicle requests for AC power at varying specified frequencies, and the electric carrier motor is powered by AC power of the specified frequencies delivered from the vehicle inverter.

2. The electric carrier of claim 1 further comprising:
the electric carrier having an electric vehicle for transport.

3. The electric carrier of claim 1, wherein:
the way is a waterway, and the electric carrier is an electric ferry; or
the way is a railway, and the electric carrier is an electric railcar.

4. A method for transporting an electric vehicle on an electric carrier, the method comprising:
mounting the electric vehicle on the electric carrier;
electrically connecting the electric carrier to the electric vehicle;
delivering, from the electric vehicle to the electric carrier, variable frequency AC power supplied by a vehicle inverter;
powering an electric carrier motor of the electric carrier by the electric power delivered from the electric vehicle;
synchronously controlling the electric carrier and the vehicle inverter, for driving the electric carrier; and
transporting the electric vehicle by the electric carrier.

* * * * *